United States Patent
Avritch et al.

(10) Patent No.: US 10,338,539 B1
(45) Date of Patent: Jul. 2, 2019

(54) ACTUATOR CONTROL SYSTEM WITH TRANSIENT REDUCTION AFTER REDUNDANCY LEVEL CHANGES

(71) Applicant: Hamilton Sundstrand Corporation, Charlotte, NC (US)

(72) Inventors: Steven A. Avritch, Bristol, CT (US); Jeffrey A. Eldridge, Ellington, CT (US); David F. Dickie, Bloomfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 15/898,877

(22) Filed: Feb. 19, 2018

(51) Int. Cl.

| | | |
|---|---|---|
| *G05B 5/01* | (2006.01) | |
| *G05B 11/42* | (2006.01) | |
| *H02P 9/04* | (2006.01) | |
| *G05D 19/02* | (2006.01) | |
| *B23Q 15/24* | (2006.01) | |
| *G05B 13/04* | (2006.01) | |
| *G05D 3/14* | (2006.01) | |
| *G05B 17/02* | (2006.01) | |
| *H02P 9/00* | (2006.01) | |

(52) U.S. Cl.
CPC .............. *G05B 11/42* (2013.01); *B23Q 15/24* (2013.01); *G05B 13/042* (2013.01); *G05B 17/02* (2013.01); *G05D 3/1463* (2013.01); *G05D 19/02* (2013.01); *H02P 9/008* (2013.01); *H02P 9/04* (2013.01)

(58) Field of Classification Search
CPC ....... G05B 11/42; G05B 13/042; B23Q 15/24
USPC .......................................................... 318/615
See application file for complete search history.

(56) References Cited

U.S. PATENT DOCUMENTS

| | | | |
|---|---|---|---|
| 5,206,570 A | 4/1993 | Hargarten et al. | |
| 2015/0198935 A1* | 7/2015 | Kaku | H02P 23/12 318/561 |
| 2016/0001810 A1* | 1/2016 | Tsubaki | B62D 5/0472 701/42 |
| 2018/0262143 A1* | 9/2018 | Miklosovic | H02P 23/0031 |
| 2018/0273330 A1* | 9/2018 | Kakimoto | B65H 23/1806 |
| 2018/0283512 A1* | 10/2018 | Tsujimura | F16D 63/006 |

FOREIGN PATENT DOCUMENTS

WO       2017026234       2/2017

* cited by examiner

*Primary Examiner* — Erick D Glass
(74) *Attorney, Agent, or Firm* — Carlson, Gaskey & Olds, P.C.

(57) ABSTRACT

An example actuator control system includes an actuator, a plurality of motors configured to cooperatively operate the actuator, and a controller. The controller is configured to determine an output signal for controlling active ones of the motors during a current update cycle based on a first gain value, an integral contribution from the current update cycle, and an integral contribution from a preceding update cycle. The controller is configured to, based on a quantity of the motors that is active differing between the current and preceding update cycles, scale the integral contribution from the preceding update cycle for the output signal determination based on the first gain value and a second gain value from the preceding update cycle. A method of controlling a plurality of actuator motors is also disclosed.

20 Claims, 5 Drawing Sheets

ACTUATOR CONTROL SYSTEM WITH TRANSIENT REDUCTION AFTER REDUNDANCY LEVEL CHANGES

BACKGROUND

This application relates to an actuator control system, and more particularly to an actuator control system that provides a transient reduction after redundancy level changes.

Linear actuators a move along a longitudinal axis to linearly move a load. Linear actuators can be controlled using a closed-loop control system which provides an output control signal based on a desired value (also known as a "setpoint") and a feedback value (also known as a "process variable"). The feedback value is obtained from a feedback loop, and provides for determining an error between the desired value and the feedback value. A proportional integral derivative (PID) controller is a closed-loop controller that utilizes such a control arrangement. A PID controller includes a proportional (P) term that provides for a gross error adjustment, an integral (I) term that provides for a steady state error adjustment, and a derivative (D) term for anticipating the feedback value overshooting the desired value.

Some control systems include multiple motors for redundantly operating an actuator. If one of the motors experiences a fault condition and becomes unavailable, the remaining active motors can compensate by increasing their output. However, as the quantity of active motors changes, transient errors may appear in a feedback signal.

SUMMARY

An example actuator control system includes an actuator, a plurality of motors configured to cooperatively operate the actuator, and a controller. The controller is configured to determine an output signal for controlling active ones of the motors during a current update cycle based on a first gain value, an integral contribution from the current update cycle, and an integral contribution from a preceding update cycle. The controller is configured to, based on a quantity of the motors that is active differing between the current and preceding update cycles, scale the integral contribution from the preceding update cycle for the output signal determination based on the first gain value and a second gain value from the preceding update cycle.

An example method of controlling a plurality of actuator motors includes cooperatively operating an actuator using a plurality of motors. An output signal for controlling active ones of the plurality of motors during a current update cycle is determined based on a first gain value, an integral contribution from the current update cycle, and an integral contribution from a preceding update cycle. Based on a quantity of the motors that is active differing between the current and preceding update cycles, the integral contribution from the preceding update cycle is scaled for the output signal determination based on the first gain value and a second gain value from the preceding update cycle.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
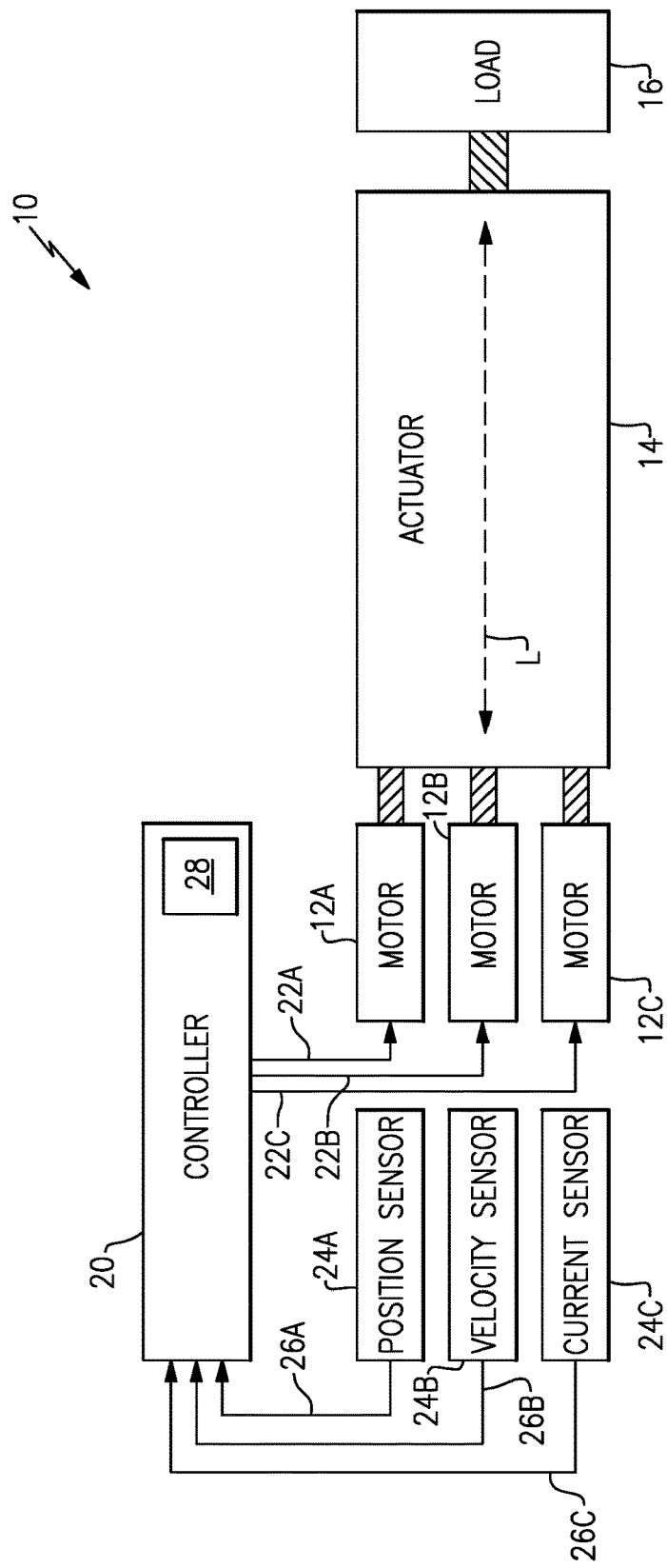
FIG. 1 is a schematic view of an example actuator control system.

FIG. 1 is a schematic view of an example actuator control system 10. A plurality of motors 12A-C redundantly and cooperatively operate an actuator 14. The actuator, in turn, moves a load 16. A controller 20 outputs control signals schematically shown as 22A-C to the plurality of motors 12A-C for controlling the plurality of motors 12 during a current update cycle.

The actuator control system 10 includes at least one position sensor 24A, at least one velocity sensor 24B, and at least one electrical current sensor 24C. Although FIG. 1 only depicts a single position sensor 24A, velocity sensor 24B, and electrical current sensor 24C, it is understood that in some examples each motor 12A-C has a dedicated position sensor 24A, dedicated velocity sensor 24B, and dedicated electrical current sensor 24C. In one example, the at least one position sensor 24A and at least one velocity sensor 24B for a given one of the motors 12 are the same sensor.

The controller 20 obtains position feedback 26A from the at least one position sensor 24A, obtains velocity feedback 26B from the at least one velocity sensor 24B, and obtains electrical current feedback 26C from the at least one electrical current sensor 24C. In one example in which each motor 12A-C has a dedicated position sensor 24A, velocity sensor 24B, and electrical current sensor 24C, the controller receives separate position feedback 26A, velocity feedback 26B, and electrical current feedback 26C for each of the motors 12A-C. The controller 20 updates the control signals 22A-C during a subsequent update cycle based on the feedback 26. The controller 20 includes memory 28 that stores a plurality of sets of predefined gain values that are used for determining the control signal 22. Each set of gain values corresponds to a quantity of the motors 12 that are active during a given update cycle.

Each of the sensors 24A-C is associated with the actuator 14. In one example, the position sensor 24A measures a position of the actuator 14 or an associated one of the motors 12. In one example, the velocity sensor 24B measures a speed of movement of the actuator 14 or an associated one of the motors 12. In one example, the current sensor 24C measures an electrical current delivered to an associated one of the motors 12. In one example, the at least one position sensor 24A and velocity sensor 24B are the same sensor, and the velocity feedback 24B for a given one of the motors 12 is derived from the position feedback 26A for the given one of the motors. In one example, one or more of the sensors are linear variable differential transformers (LVDTs).

In one example, the motors 12A-C are linear motors and the actuator 14 is a linear actuator that moves along a longitudinal axis L between various positions to linearly move the load 16. However, other types of motors could be used, such as rotary motors. In one example, the load 16 includes a rotor of a rotorcraft, and the actuator 14 is configured to control an aspect of the rotor, such as an angle of attack of the rotor. Of course other loads 16 and other types of actuators 14 could be used in the system 10. Also, other quantities of motors 12 could be used that cooperatively operate the actuator 14.

The motors 12A-C provide for redundant operation of the actuator 14. If one of the motors 12 experiences a fault condition and/or becomes unavailable, the remaining active motors can compensate by increasing their output. If the controller 20 detects that one of the motors 12 is unavailable (e.g., based on the feedback 26 from sensors 24), it will adjust the control signal 22 accordingly to increase reliance on the available ones of the motors 12.

Figure 2:
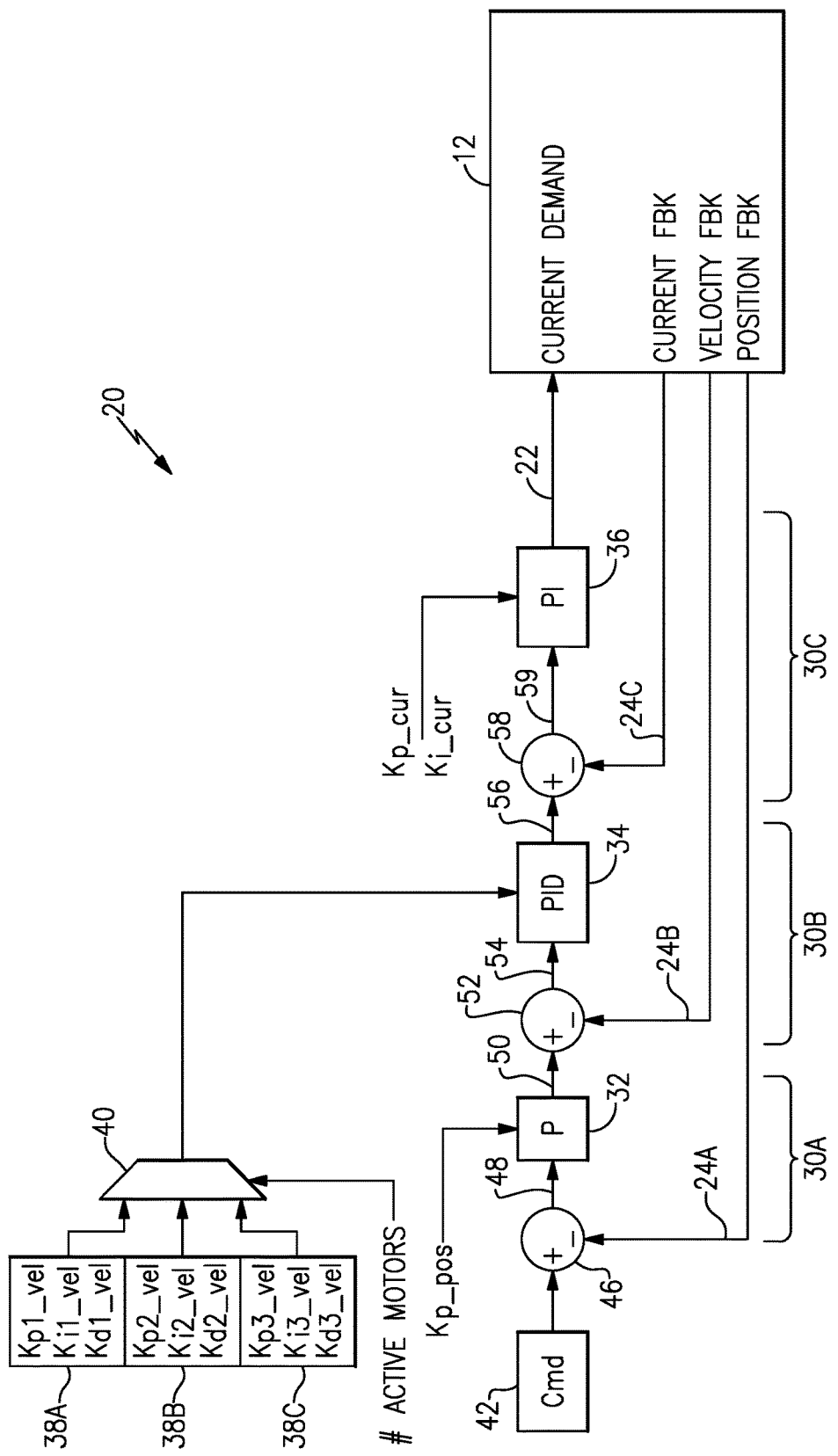
FIG. 2 is a schematic view of an example implementation of a controller of FIG. 1 that utilizes position, velocity, and electrical current loops.

FIG. 2 is a schematic view of an example implementation of the controller 20 of FIG. 1. The controller 20 includes three separate feedback loops 30A-C. Feedback loop 30A is a position loop that utilizes the position feedback 24A and a proportional (P) control 32. Feedback loop 30B is a velocity loop that utilizes the velocity feedback 24B and a proportional integral derivative (PID) control 34. Feedback loop 30C is an electrical current loop that utilizes the electrical current feedback 24C and a proportional integral (PI) control 36. In one example, the controller 20 implementation of FIG. 2 is separately performed for each of the motors 12A-C based on the specific feedback for each of the motors for a given update cycle (e.g., update command 22A for motor 12A based on feedback from motor 12A, update command 22B for motor 12B based on feedback from motor 12B, and update command 22C for motor 12B based on feedback from motor 12C).

A plurality of sets of velocity gain values used in the velocity feedback loop 24B are schematically shown as 38A-C. Gain set 38A represents "simplex" gains for when a single one of the motors 12 is active. Gain set 38B represents "duplex" gains for when two of the motors 12 are active. Gain set 38C represents "triplex" gains for when all three of the motors 12 are active. A multiplexer 40 selects which of the gain sets 38 to use based on a quantity of the motors 12 that are currently active.

Within each gain set 38, the $K_p$ value represents a proportional gain for the feedback loop 30B, the $K_i$ value represents an integral gain for the feedback loop 30B, and the $K_d$ value represents a derivative gain for the feedback loop 30B. In the position feedback loop 30A, a proportional gain $K_{p\_pos}$ is used (with the "p" denoting proportional and the "pos" denoting position feedback loop 30A), and in the electrical current feedback loop 30C a proportional gain $K_{p\_cur}$ and integral gain $K_{i\_cur}$ (with the "p" and "i" representing proportional and integral gains, respectively, and the "cur" denoting electrical current feedback loop 30C). In one example, the same $K_{p\_pos}$, $K_{p\_cur}$, and $K_{i\_cur}$ values are used regardless of how many of the motors 12 are active.

A command 42 is received indicating a desired position for a given one of the motors 12A-C 14. An actual position of the given motor 12 is received via feedback 24A and is subtracted by a summer 46 to obtain a position error 48, which the P control 32 multiplies by the proportional gain $K_{p\_pos}$ to obtain a velocity demand 50.

The velocity demand 50 is output by the proportional control 32 and provided to summer 52 in the velocity feedback loop 30B. The summer 52 subtracts an actual velocity value received as velocity feedback 24B from the velocity demand 50 to obtain a velocity error 54 that is provided to the PID control 34.

The PID control 34 utilizes the velocity error 54 from the summer 52, along with the set 38 of gains corresponding to the number of motors 12 active during a current update cycle to determine an electrical current demand 56 which is required to close the position error 48. The electrical current demand 56 is provided to summer 58 in the electrical current feedback loop 30C.

The summer 58 subtracts an electrical current feedback value 24C from the electrical current demand 56 to determine an electrical current error 59 which is provided to PI control 36. PI control 36 utilizes the electrical current error 59 along with the $K_{p\_c}$ and $K_{i\_c}$ gain values to determine a voltage demand needed to obtain a desired electrical current. The voltage demand is used as the control signal 22 that is provided to the given one of the motors 12, as shown in FIG. 1.

The controller 20 provides an updated control signal 22 during each update cycle based on the feedback 26A-C received in the feedback loops 30A-C. The duration of an update cycle can be selected based on an intended application. In some examples, many update cycles occur per second.

Figure 3:
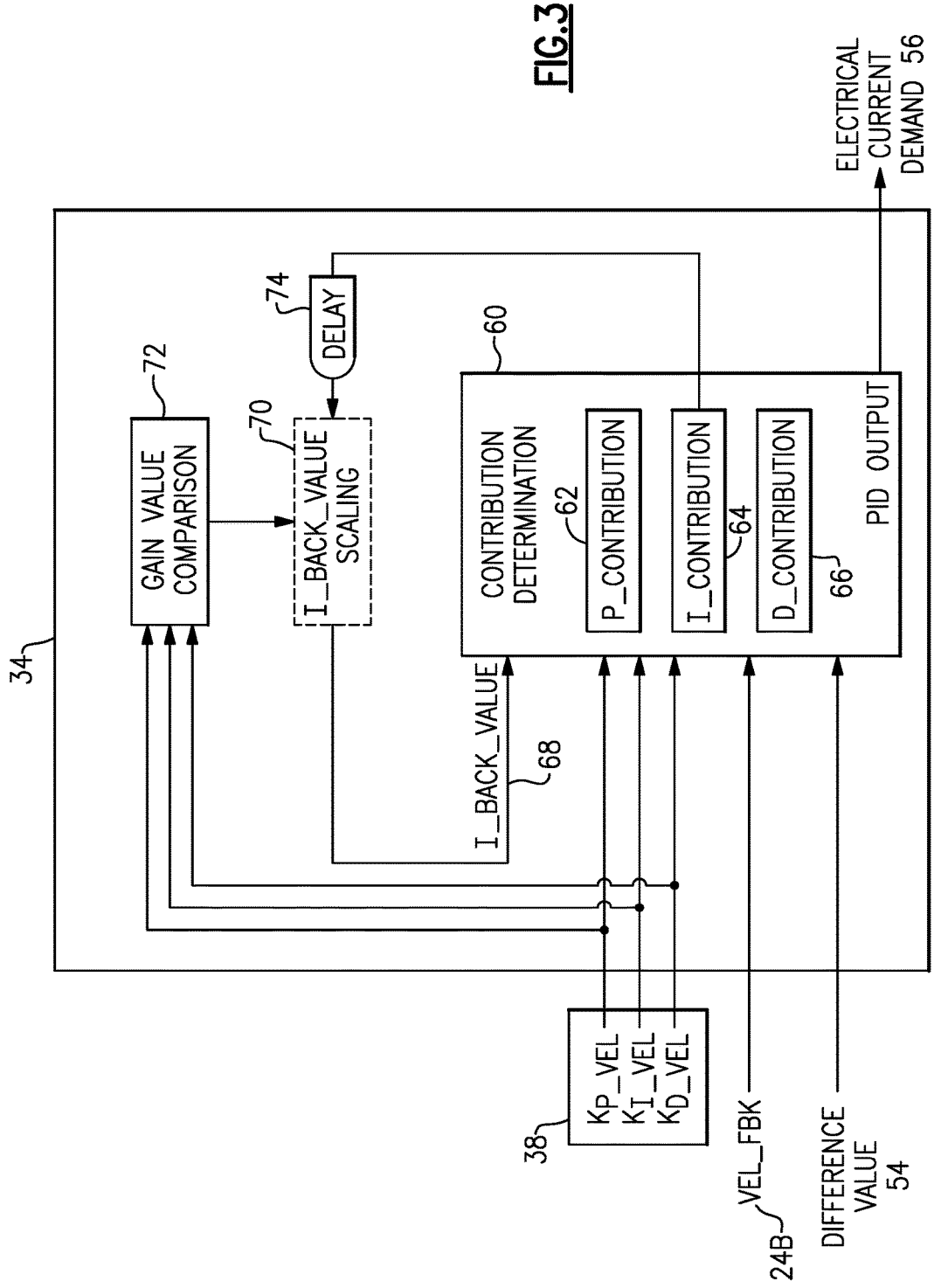
FIG. 3 is a schematic view of an example scaling feature for use in a PID of FIG. 2.

FIG. 3 is a schematic view of an example scaling feature for use in the PID control 34 of FIG. 2. As shown in FIG. 3, the PID control 34, receives a gain set 38 as an input that includes gains $K_{p\_vel}$, $K_{i\_vel}$ and $K_{d\_vel}$ corresponding the quantity of motors 12 that are currently active. The PID block 34 also receives a velocity feedback value 24B from the feedback loop 30B and receives the velocity error 54 from summer 52. The PID control 34 includes a contribution determination block 60 that determines the electrical current demand 56 based on a proportional "P" contribution 62, integral "I" contribution 64, and derivative "D" contribution 66. Each of these P, I, and D contributions 62-66 are calculated during each update cycle. An output of the contribution determination block 60 (see "PID OUTPUT" in FIG. 3) is provided as the electrical current demand 56 of FIG. 2. In one example, the electrical current demand 56 is the sum of the P contribution 62, I contribution 64, and D contribution 66.

As part of determining the I contribution 64, the contribution determination block 60 utilizes the I contribution from a preceding update cycle, also known as an "integral back value" 68 (and shown as "I_back_value" in FIG. 3). The integral back value 68 is held in a delay buffer 74. The integral back value 68 from the preceding update cycle provides a historical component when determining the updated I contribution 64 for the current update cycle. In one example, the integral back value 68 is from an immediately preceding update cycle.

In one example, the P contribution 62 and D contribution 66 are calculated based only on non-feedback inputs, whereas the I contribution 64 is determined based on feedback, including the integral back value 68.

If the quantity of active motors 12 changes, a different gain set 38 will be selected for the upcoming update cycle, but the integral back value 68 from the preceding update cycle (which used the old gain set 38) is still needed. The simultaneous change in redundancy level and gains introduces a transient error in actuator position (e.g., position feedback 24A) due to the velocity feedback loop 30B of the PID control 34 taking time to adjust to the new gain. Such transient values are undesirable because they represent a false error that does not need correction, and that the controller 20 may otherwise attempt to correct by unnecessarily adjusting its control signal 22.

One method for addressing such a transient in a PID controller is to zero out the integral back value 68 through in an integrator reset operation. However, this only provides for limited mitigation of a transient error.

The PID control 34 takes a different approach by introducing a scaling feature 70 that selectively scales the integral back value 68 based on whether the gain set 38 has changed. A gain value comparison feature 72 compares the gain set 38 for a current update cycle against the gain set 38 from a preceding update cycle to determine if those values have changed based on a change in the quantity of active motors 12.

If the gain set 38 has not changed from the preceding update cycle, the optional scaling 70 is not performed and the integral back value 68 is used from the preceding update cycle without scaling. However, if the gain values have changed, indicating a change in the quantity of active motors 12, the integral back value 68 is scaled using the optional scaling feature 70. This scaling mitigates the transient error that would otherwise occur in a position error signal.

In one example, the scaling 70 is based on a ratio of the old gain value $Ki_{old}$ from the preceding update cycle to the new value $Ki_{new}$ of the current update cycle according to the following logic:

If gain set 38 has changed:

$$\text{Then: I\_back\_value} = \text{I\_back\_value} \times \frac{Ki_{old}}{Ki_{new}}$$

Else:

$$\text{I\_back\_value} = \text{I\_back\_value}$$

The expression $$\text{I\_back\_value} \times \frac{Ki_{old}}{Ki_{new}}$$

represents a scaled integral back value 68 value that the integral back value 68 is expected to settle to. By setting the integral back value 68 to that scaled value and applying it right after a gain change (e.g., in the immediately following update cycle), transient error associated with the redundancy change can be eliminated.

The internal workings of the contribution determination block 60 are known to those of ordinary skill in the art and are not discussed in detail herein.

Although FIG. 3 describes scaling 70 for an integral back value 68 of a PID control 34, the same scaling technique could be applied to non-PID controls that also use an integral term, such as the PI control 36.

Figure 4A:
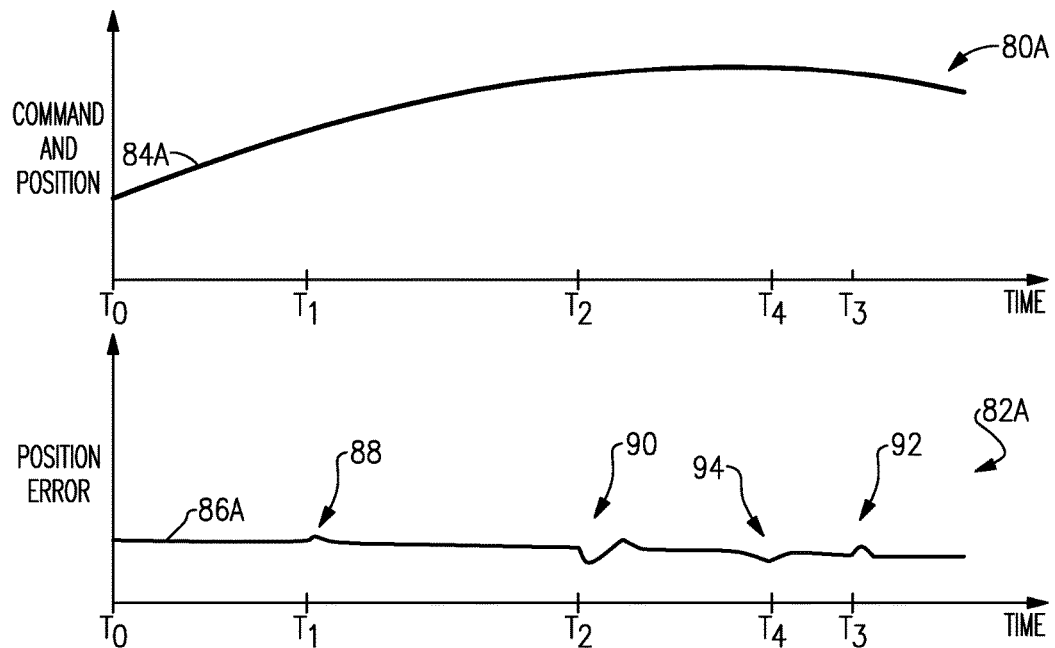
FIG. 4A illustrates a pair of graphs that demonstrate transient values after changes in motor redundancy level.

FIG. 4A illustrates a pair of graphs 80A, 82A that demonstrate transient values after changes in motor redundancy level. Graph 80A plots a position command and an actual position over time as 84A. In the example of graph 80A, the command and position 84A are represented by a single line because the command and position do not significantly differ from each other. The position and command 84A indicates that the actuator 14 is moving in a first direction until approximately time T4, at which the actuator 14 reverses direction.

Graph 82A depicts a position error 86A corresponding to the feedback 24A from FIG. 2. From time T0 to time T1, all three motors 12 are active. At time T1, the quantity of active motors 12 reduces to 1, and a transient value 88 value appears on line 86A. This transient value appears despite there being no difference between the command and actual position 84A at time T1. At time T2, the quantity of active motors 12 increases from 1 to 2 and a second transient value 90 appears on line 86A. At time T3 the quantity of active motors 12 increases from 2 to 3 and a third transient value 92 appears on the line 86A. As with the transient value 88, at times T2 and T3 there is still no difference between the command and actual position shown 84A at times T2 and T3. Nevertheless, the simultaneous change in redundancy level and gains introduces the transient values 88, 90, and 92, due to the velocity feedback loop 30B taking time to readjust to the new gain set 38.

The position time occurring at approximately T4 corresponds to the actuator 14 reversing direction, and provides a perturbance at 94 on the graph, but this is not an error due to a change in redundancy level.

Figure 4B:
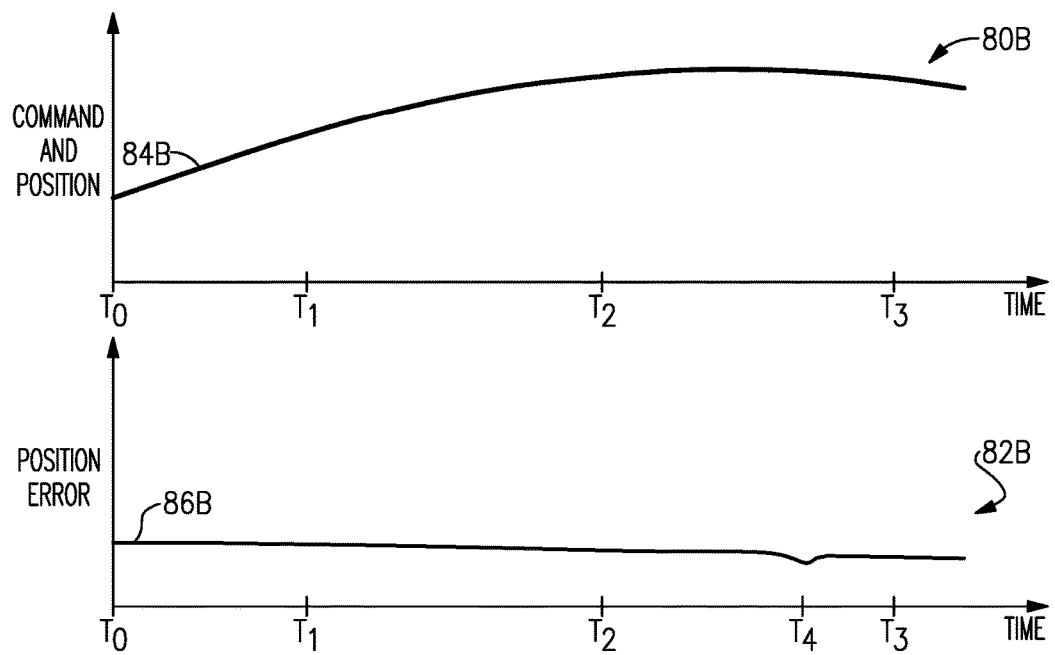
FIG. 4B illustrates a pair of graphs that demonstrate absence of transient values after changes in motor redundancy level.

Referring now to FIG. 4B, a graph 80B is shown with the same position and command 84B with the same changes in quantities of active motors at times T1, T2, and T3, and direction change at approximately T4. However, the PID control 34 in FIG. 4B utilizes the scaling feature 70 discussed above and as shown the transient values 88, 90, and 92 no longer appear in graph 86B.

Figure 5:
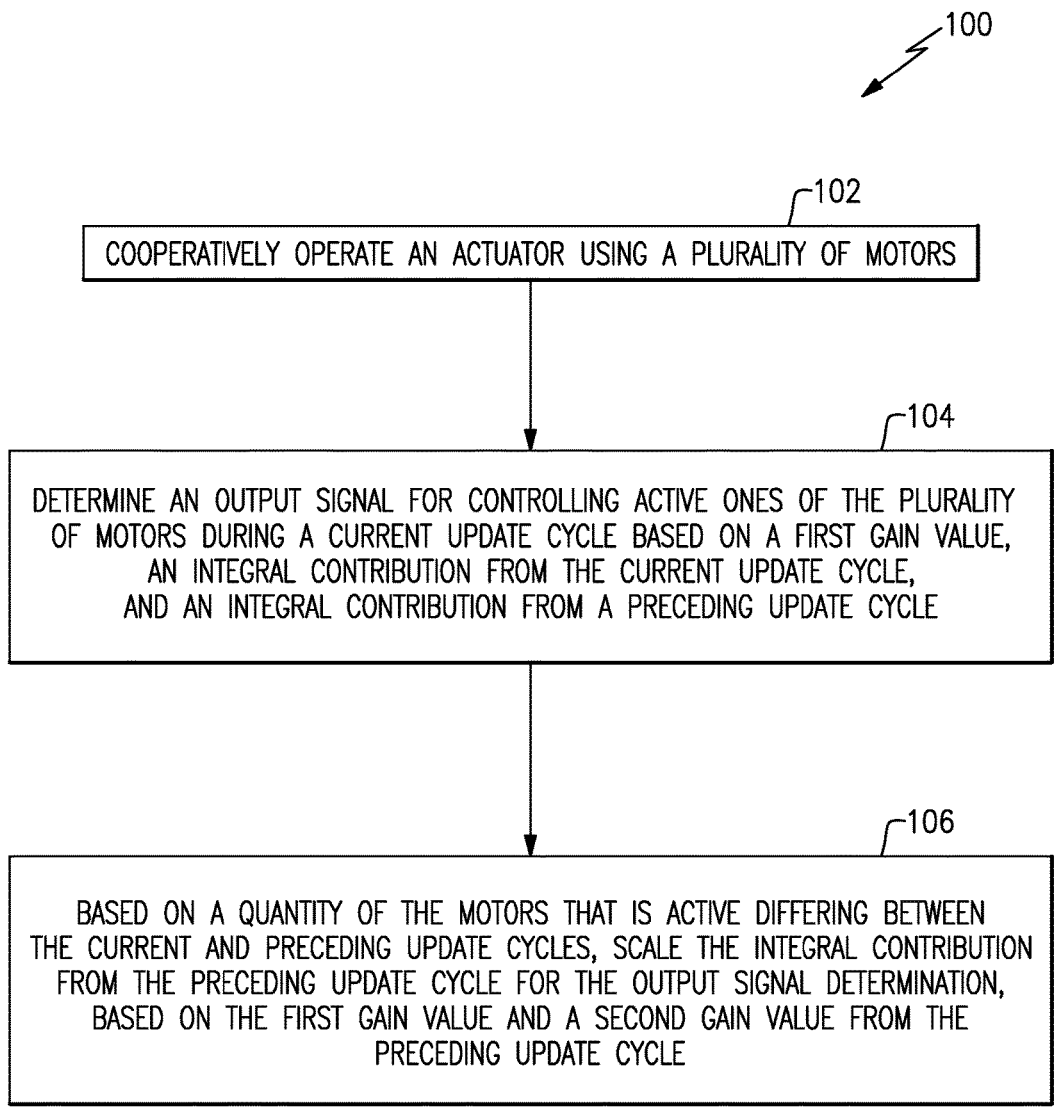
FIG. 5 is a flowchart of an example method of controlling a plurality of actuator motors.

FIG. 5 schematically illustrates a flow chart 100 of an example method of controlling a plurality of actuator motors 12. An actuator 14 is cooperatively operated using a plurality of motors 12 (block 102). An output signal is determined for controlling active ones of the plurality of motors 12 during a current update cycle (block 104). The output signal is determined based on a first gain value (corresponding to a first quantity of the motors that are active during the current update cycle), an integral contribution from the current update cycle, and an integral contribution from a preceding update cycle. Based on the quantity of the motors 12 that is active differing between the current and preceding update cycles, the integral contribution from the preceding update cycle is scaled for the output signal determination (block 106). The scaling is based on the first gain value and a second gain value from the preceding update cycle.

Although FIG. 2 utilizes a P control 32 for position feedback loop 30A, PID control for velocity feedback loop 30B, and PI control 36 for position feedback loop 30C, it is understood that this is a non-limiting example and that the various controls could be used for different ones of the loops (e.g., PID for position feedback loop 30A).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An actuator control system comprising:
   an actuator;
   a plurality of motors configured to cooperatively operate the actuator; and
   a controller configured to:
      determine an output signal for controlling active ones of the motors during a current update cycle based on a first gain value, an integral contribution from the current update cycle, and an integral contribution from a preceding update cycle; and
      based on a quantity of the motors that is active differing between the current and preceding update cycles, scale the integral contribution from the preceding update cycle for the output signal determination based on the first gain value and a second gain value from the preceding update cycle.

2. The actuator control system of claim 1, wherein:
the first gain value is part of a first set of gain values used by the controller when a first quantity of the motors are active;
the second gain value is part of a second set of gain values used by the controller when a second quantity of the motors are active; and
the first and second sets of gain values each include a respective proportional gain value, integral gain value, and derivative gain value.

3. The actuator control system of claim 1, wherein the scaling is performed as part of a proportional integral derivative (PID) feature of the controller.

4. The actuator control system of claim 1, wherein the scaling is performed as part of a proportional integral (PI) feature of the controller.

5. The actuator control system of claim 1, wherein the scaling is based on a ratio between the first and second gain values.

6. The actuator control system of claim 5, wherein the ratio is a ratio of the second gain value to the first gain value, and the scaling comprises multiplication of the integral contribution from the preceding update cycle by the ratio.

7. The actuator control system of claim 6, wherein the output signal is further based on a proportional contribution and a derivative contribution, both from the current update cycle.

8. The actuator control system of claim 1, comprising at least one sensor configured to provide feedback from the actuator or at least one of the motors, wherein the controller is configured to determine the output signal based on the feedback.

9. The actuator control system of claim 1, wherein the actuator is a linear actuator.

10. The actuator control system of claim 1, wherein the actuator is configured to control a rotor of a rotorcraft.

11. A method of controlling a plurality of actuator motors, comprising:
cooperatively operating an actuator using a plurality of motors;
determining an output signal for controlling active ones of the motors during a current update cycle based on a first gain value, an integral contribution from the current update cycle, and an integral contribution from a preceding update cycle; and
based on a quantity of the motors that is active differing between the current and preceding update cycles, scaling the integral contribution from the preceding update cycle for the output signal determination based on the first gain value and a second gain value from the preceding update cycle.

12. The method of claim 11, comprising:
selecting the first gain value during the current update cycle based on a quantity of the motors that are active during the current update cycle;
selecting the second gain value during the preceding update cycle based on a quantity of the motors that are active during the preceding update cycle.

13. The method of claim 11, wherein:
the first gain value is part of a first set of gain values used for said determining when a first quantity of the motors are active; and
the second gain value is part of a second set of gain values used for said determining when a second quantity of the motors are active.

14. The method of claim 13, wherein the first and second sets of gain values each include a respective proportional gain value, integral gain value, and derivative gain value.

15. The method of claim 11, wherein said determining and scaling are performed as part of a proportional integral derivative (PID) or a proportional integral (PI) control feature.

16. The method of claim 11, wherein said scaling is based on a ratio between the first and second gain values.

17. The method of claim 16, wherein the ratio is a ratio of the second gain value to the first gain value, and the scaling comprises multiplying the integral contribution from the preceding update cycle by the ratio.

18. The method of claim 17, wherein said determining is further based on a proportional contribution from the current update cycle and a derivative contribution from the current update cycle.

19. The method of claim 11, comprising:
receiving sensor data from at least one sensor associated with the actuator;
wherein said determining is based the sensor data.

20. The method of claim 19, wherein said receiving sensor data comprises:
receiving position data from a position sensor;
determining velocity data from the position data; and
receiving electrical current data from an electrical current sensor.

* * * * *